United States Patent
Hong et al.

(10) Patent No.: US 12,500,786 B1
(45) Date of Patent: Dec. 16, 2025

(54) CLOUD-BASED AUDIO CONFERENCE SESSION TRANSFER

(71) Applicant: Zoom Communications, Inc., San Jose, CA (US)

(72) Inventors: Karen Kuei Ren Hong, Los Altos, CA (US); Bin Jiang, San Jose, CA (US); Lin Sun, Cupertino, CA (US); Yueming Zhang, Hefei (CN)

(73) Assignee: Zoom Communications, Inc., San Jose, CA (US)

( * ) Notice: Subject to any disclaimer, the term of this patent is extended or adjusted under 35 U.S.C. 154(b) by 0 days.

(21) Appl. No.: 18/392,333

(22) Filed: Dec. 21, 2023

(51) Int. Cl.
*H04L 12/18* (2006.01)
*H04L 65/1045* (2022.01)

(52) U.S. Cl.
CPC ...... *H04L 12/1822* (2013.01); *H04L 12/1818* (2013.01); *H04L 65/1045* (2022.05)

(58) Field of Classification Search
CPC ............ H04L 12/1822; H04L 65/1045; H04L 12/1818
See application file for complete search history.

(56) References Cited

U.S. PATENT DOCUMENTS

| | | | |
|---|---|---|---|
| 8,542,812 B2 * | 9/2013 | Danielsen ............. | H04L 65/403 379/202.01 |
| 8,639,230 B2 | 1/2014 | Williams et al. | |
| 8,788,704 B1 * | 7/2014 | Chen ................. | H04M 3/42042 379/900 |
| 9,392,035 B1 * | 7/2016 | Jones ...................... | H04L 67/54 |
| 9,787,844 B2 * | 10/2017 | Rey ........................ | H04M 3/56 |
| 9,912,623 B2 * | 3/2018 | Yu .......................... | H04L 51/063 |
| 10,117,211 B2 * | 10/2018 | Piscopo, Jr. .......... | H04W 60/00 |
| 10,135,994 B2 | 11/2018 | Kleiner et al. | |
| 10,666,691 B2 * | 5/2020 | Richards ................ | H04L 67/14 |
| 11,356,562 B2 | 6/2022 | Krochmal et al. | |
| 11,557,296 B2 | 1/2023 | Dunn et al. | |
| 12,212,971 B2 * | 1/2025 | Moore ................ | H04L 63/1466 |
| 2023/0162738 A1 | 5/2023 | Dunn et al. | |

FOREIGN PATENT DOCUMENTS

EP 3276905 B1 1/2023

* cited by examiner

*Primary Examiner* — Nazia Naoreen
(74) *Attorney, Agent, or Firm* — Young Basile Hanlon & MacFarlane, P.C.

(57) ABSTRACT

A server of a system is configured to transmit a message from a first device that includes a conference identifier (ID) and a user ID to a second device to connect the second device to an ongoing audio conference bridge call without interrupting the audio conference bridge call. By providing the conference ID and the user ID, host privileges associated with the user associated with the user ID are transferred to the second device. By transferring the host privileges to the second device, the user can, via the second device, view the participant roster and add or remove participants from the audio conference bridge call.

20 Claims, 8 Drawing Sheets

CLOUD-BASED AUDIO CONFERENCE SESSION TRANSFER

FIELD

This disclosure generally relates to cloud-based audio conferences, and, more specifically, to the transfer of a cloud-based audio conference from a first device to a second device.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
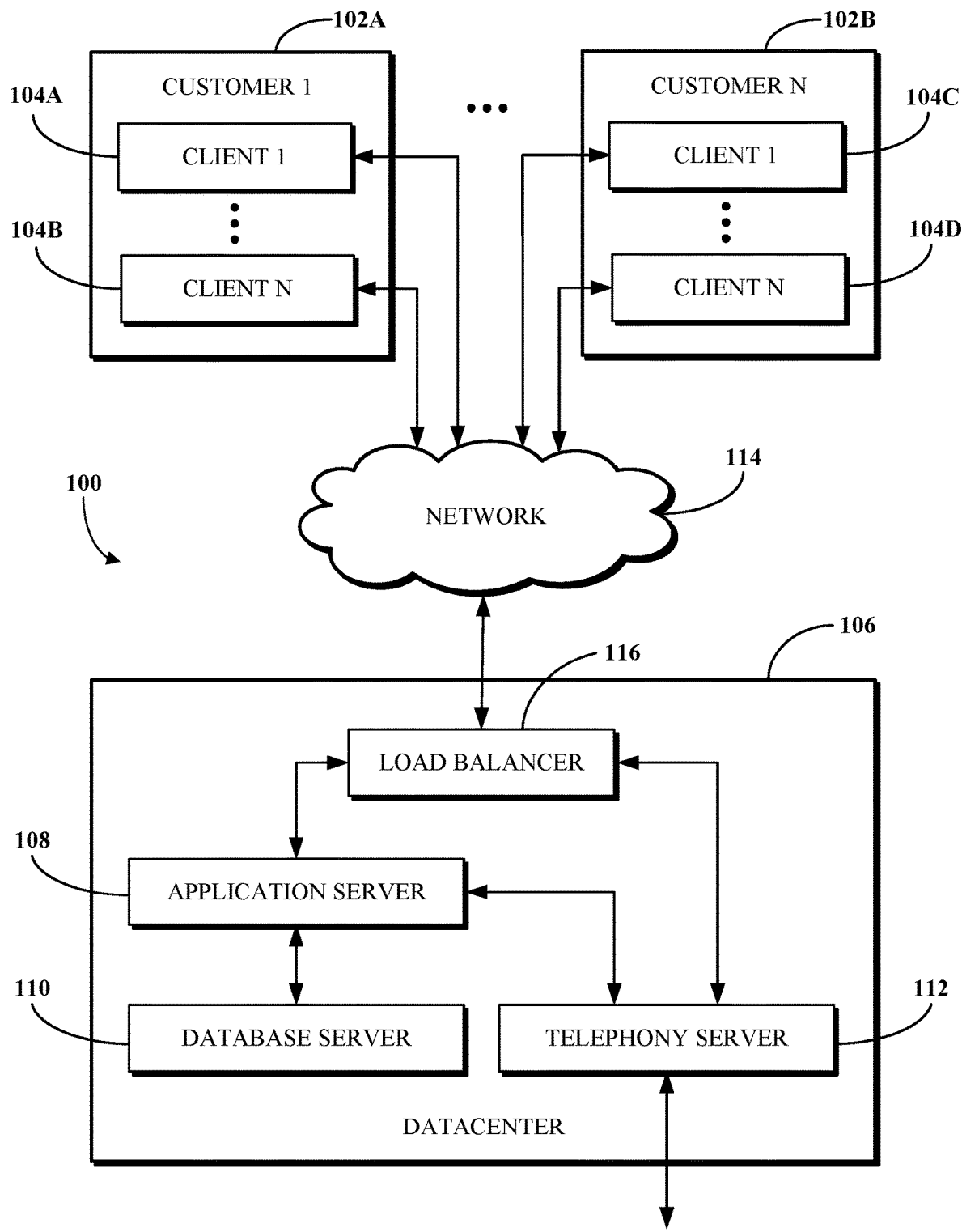
FIG. 1 is a block diagram of an example of an electronic computing and communications system.

Conferencing software is frequently used across various industries to support video-enabled conferences between participants in multiple locations. In some cases, each of the conference participants separately connects to the conferencing software from their own remote locations. In other cases, one or more of the conference participants may be physically located in and connect to the conferencing software from a conference room or similar physical space (e.g., in an office setting) while other conference participants connect to the conferencing software from one or more remote locations. Conferencing software thus enables people to conduct video conferences without requiring them to be physically present with one another. Conferencing software may be available as a standalone software product or it may be integrated within a software platform, such as a unified communications as a service (UCaaS) platform.

Conventional telephony systems, such as those of software platforms (e.g., UCaaS platforms) that use a cloud-based private branch exchange (PBX) for audio conference bridge calls, referred to herein as "audio calls," are unable to transfer ongoing audio calls from an audio-only device such as a voice-over-internet protocol (VOIP) softphone to a mobile device (e.g., a phone or laptop) to take on the go as conventional telephony systems typically do not support this feature. In addition, the call roster and any host capabilities associated with those calls, such as adding/removing participants, cannot be transferred to the mobile phone or laptop by conventional telephony systems because the call roster and host capabilities are not based on user roles in conventional telephony systems. Rather, to transfer an ongoing audio call from a VOIP softphone to another device using a conventional telephony system, the VOIP softphone must disconnect from the audio call prior to the user of the VOIP softphone rejoining the audio call from that other device. However, requiring users to disconnect from an audio call in this manner causes an interruption in the audio call that is inconvenient and can disrupt the audio call for the other participants.

Implementations of this disclosure address problems such as these using a cloud-based audio call transfer scheme that enables the transfer of audio calls from audio-only devices, such as VOIP softphones, to other devices, such as mobile devices (e.g., smartphones, laptops, or tablets). In particular, the implementations of this disclosure enable cloud-based audio call transfers by using session initiation protocol (SIP) signaling and generating a conference identifier (ID) (without creating a conference instance) that shares the same indicator (e.g., a flag) as the current conference ID of the ongoing audio call. The system confirms that the indicator of the generated conference ID and the current conference ID are the same and transmits a notification to add the mobile device to the audio call and remove the VOIP softphone from the call and transfer the call roster and/or host capabilities, if any. The call roster and/or host capabilities may be transferred based on the user's role in the conference (e.g., associating the call roster and/or host capabilities to the user's role).

To describe some implementations in greater detail, reference is first made to examples of hardware and software structures used to implement a system for cloud-based audio call transfer. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and/or to clients of a customer, such as the clients 104A through 104B for the customer 102A or the clients 104C through 104D for the customer 102B. For example, one or more of the clients 104A through 104D may be VOIP-enabled devices configured to send and receive calls over a network 114. The telephony server 112 includes a SIP zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based PBX system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client. In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
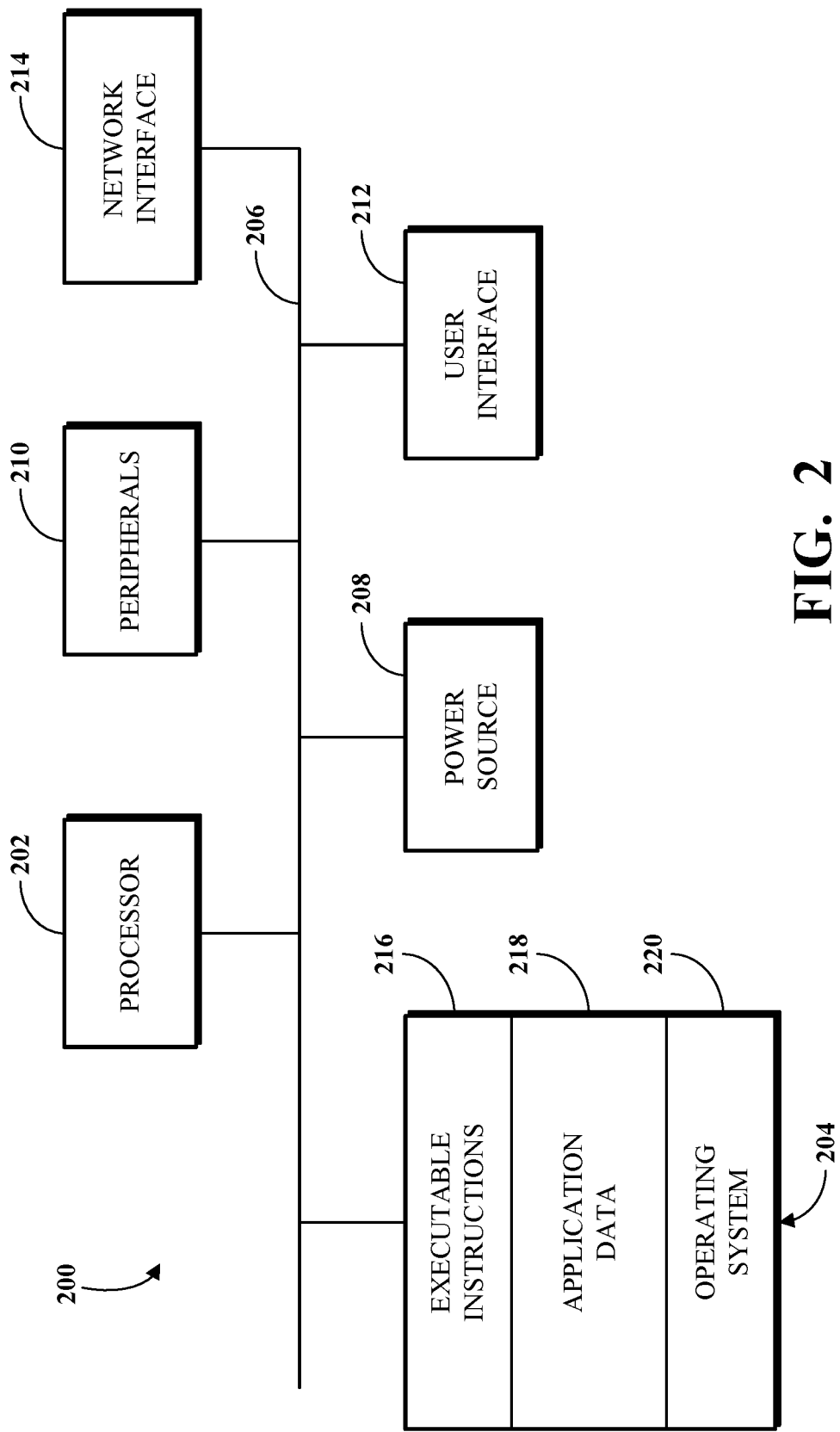
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
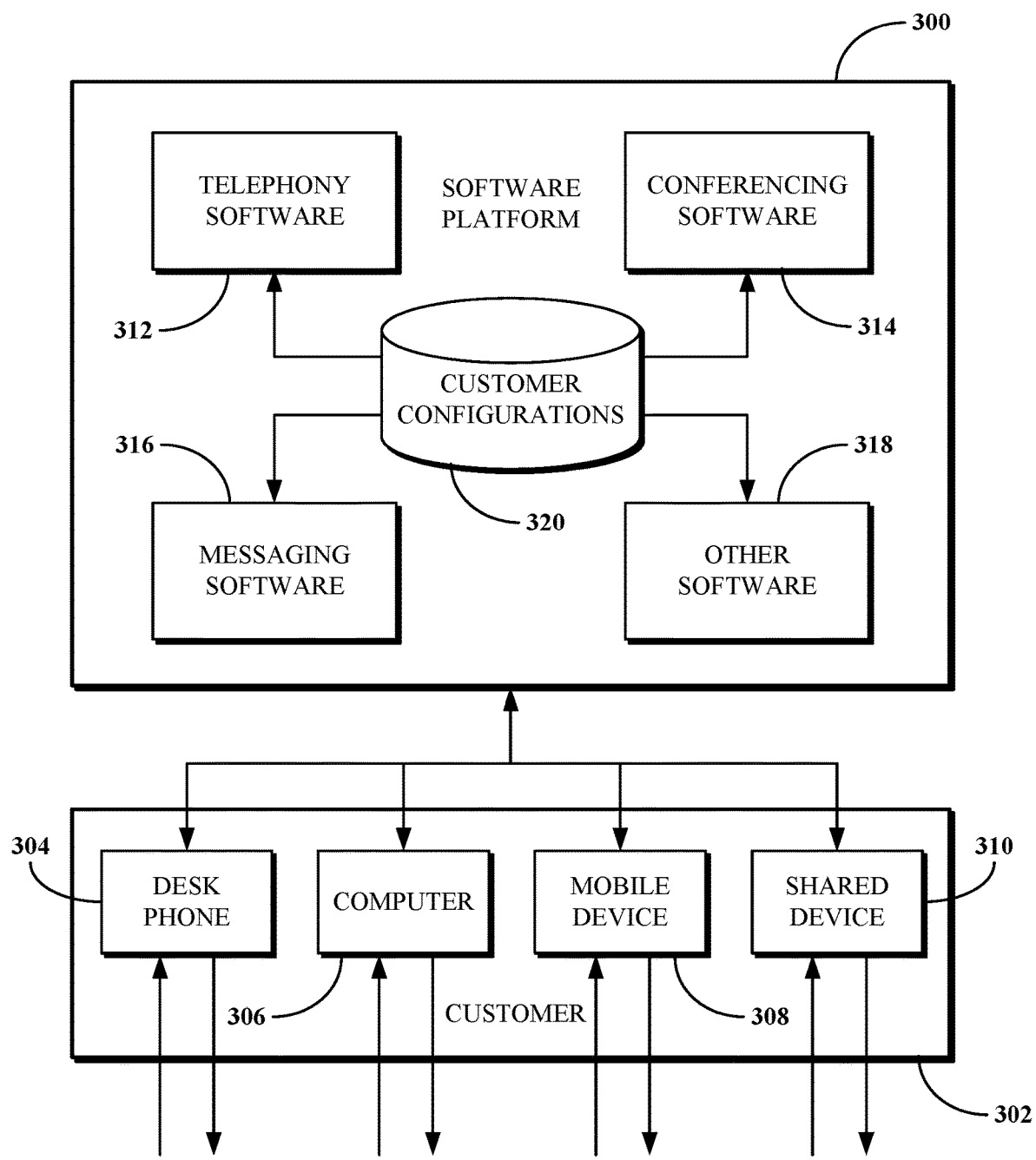
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients-a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software for enabling cloud-based audio call transfers. In some such cases, the telephony software 312 can include the other software 318.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
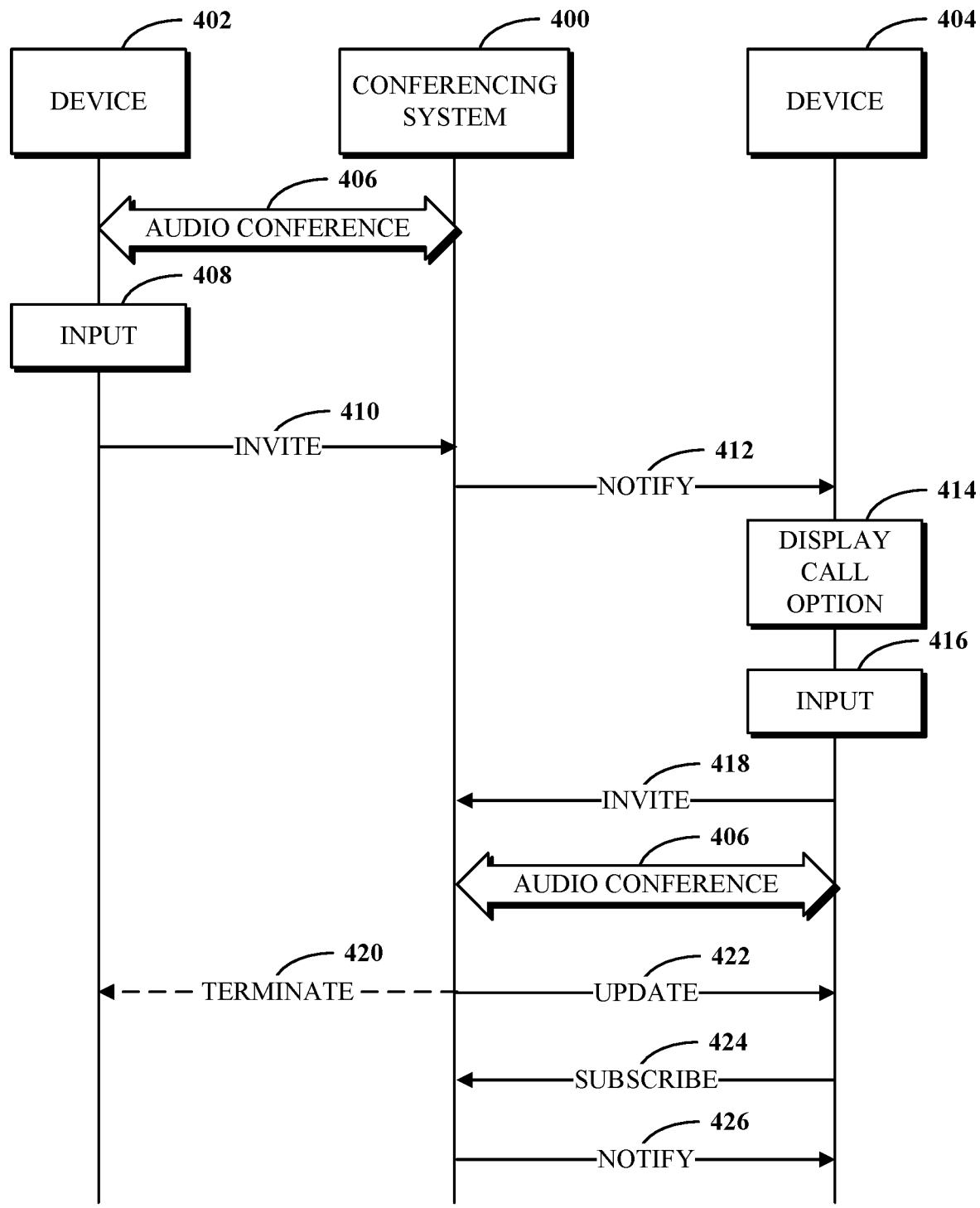
FIG. 4 is a swim lane diagram of an example of a conferencing system for transferring a cloud-based audio conference session from a first participant device to a second participant device.

FIG. 4 is a swim lane diagram of an example of a conferencing system 400 for transferring a cloud-based audio conference session from a first participant device, such as device 402, to a second participant device, such as device 404. The device 402 may be one of the desk phone 304, the computer 306, or the shared device 310 shown in FIG. 3. The device 404 may be one of the mobile device 308 or the shared device 310 shown in FIG. 3. The device 402 and the device 404 may be associated with the same user account of the conferencing system 400. For example, the device 402 may be a desk phone or a computing device associated with a user account of a participant, and the device 404 may be a mobile device or a laptop associated with the same user account of the participant.

The conferencing system 400 is configured to facilitate an audio conference session 406 between the device 402 and multiple other devices (not shown). At some point during the audio conference 406, the device 402 receives an input 408 from a user of the device 402. The input 408 may be a touch input, a gesture input, a sensor input (such as an input via a mouse or a trackpad), or an audio input. The touch input and/or the gesture input may be obtained via a display interface of the device 402. The device 402 transmits an invite message 410 to the conferencing system 400 when the input 408 is obtained. The invite message 410 may be a SIP message. The invite message 410 may include an indicator that indicates that the device 402 would like to transfer the audio conference session 406 to another device associated with the user account of the participant, such as the device 404. The conferencing system 400 receives the invite message 410 and transmits a notify message 412 to the device 404. The notify message 412 may be a SIP message. The notify message 412 may be transmitted to all the devices that are associated with the user account of the participant. The notify message 412 may include the indicator that indicates that the device 402 would like to transfer the audio conference session 406 to another device associated with the user account.

The device 404 receives the notify message 412 and displays a call option 414 based on the indicator. For example, the indicator in the notify message 412 may cause the device 404 to display a call option 414 requesting the user of the device 404 to accept or deny an audio call transfer. The device 404 receives an input 416 from the user. The input 416 may be a touch input, a gesture input, a sensor input (such as an input via a mouse, keyboard, keypad, or a trackpad), or an audio input. The touch input and/or the gesture input may be obtained via a display interface of the device 402. The device 404 transmits an invite message 418 to the conferencing system 400 when the input 416 is obtained. The invite message 418 may be a SIP message. The invite message 418 may include an indicator that indicates that the device 404 accepts the transfer of the audio conference session 406 from the device 402.

The conferencing system 400 receives the invite message 418 and connects the device 404 to the conferencing system 400 to resume the audio conference session 406. The conferencing system 400 transmits a terminate message 420 to the device 402 and an update message 422 to the device 404 based on the connection of the device 404 to the audio conference session 406. The terminate message 420 and/or the update message 422 may be SIP messages. The device 402 receives the terminate message 420 and disconnects from the audio conference session 406. In an example, the audio conference session 406 between the device 402 and the conferencing system 400 may be terminated at the conferencing system 400 such that the terminate message 420 is not transmitted to the device 402. The termination of the audio conference session 406 between the device 402 and the conferencing system 400 and the resumption of the audio conference session 406 between the device 404 and the conferencing system 400 may occur simultaneously or substantially simultaneously such that there is an imperceptible interruption in the audio conference session 406.

The update message 422 may include an ID associated with the audio conference session 406, an ID associated with the user account, an indicator that indicates that the device 404 has accepted the transfer of the audio conference session 406 from the device 402, or any combination thereof. The ID associated with the audio conference session 406, the ID associated with the user account, and/or the indicator that indicates that the device 404 has accepted the transfer of the audio conference session 406 from the device 402 may be included in a header of the update message 422, such as a P-Asserted-Identity (PAI) header. The update message 422 may be transmitted to all the other devices associated with the user account to notify those devices that they can no longer accept the transfer of the audio conference session 406.

The device 404 receives the update message 422 and transmits a subscribe message 424 to the conferencing system 400. The subscribe message 424 may include an ID associated with the device 404, a proxy authorization for the device 404, the ID associated with the audio conference session 406, an indication to subscribe to the ID associated with the audio conference session 406, or any combination thereof. The ID associated with the device 404, the proxy authorization for the device 404, the ID associated with the audio conference session 406, the indication to subscribe to the ID associated with the audio conference session 406, a request for the participant roster of the audio conference session 406, and/or a request for host privileges for the audio conference session 406 may be included in a header of the subscribe message 424, such as a PAI header. The participant roster of the audio conference session 406 includes a list of participants that are connected to the audio conference session 406. The conferencing system 400 receives the subscribe message 424 and transmits a notify message 426 to the device 404. The notify message 426 may be a SIP message that includes the participant roster of the audio conference session 406, the host privileges for the audio conference session 406, or both.

Figure 5A:
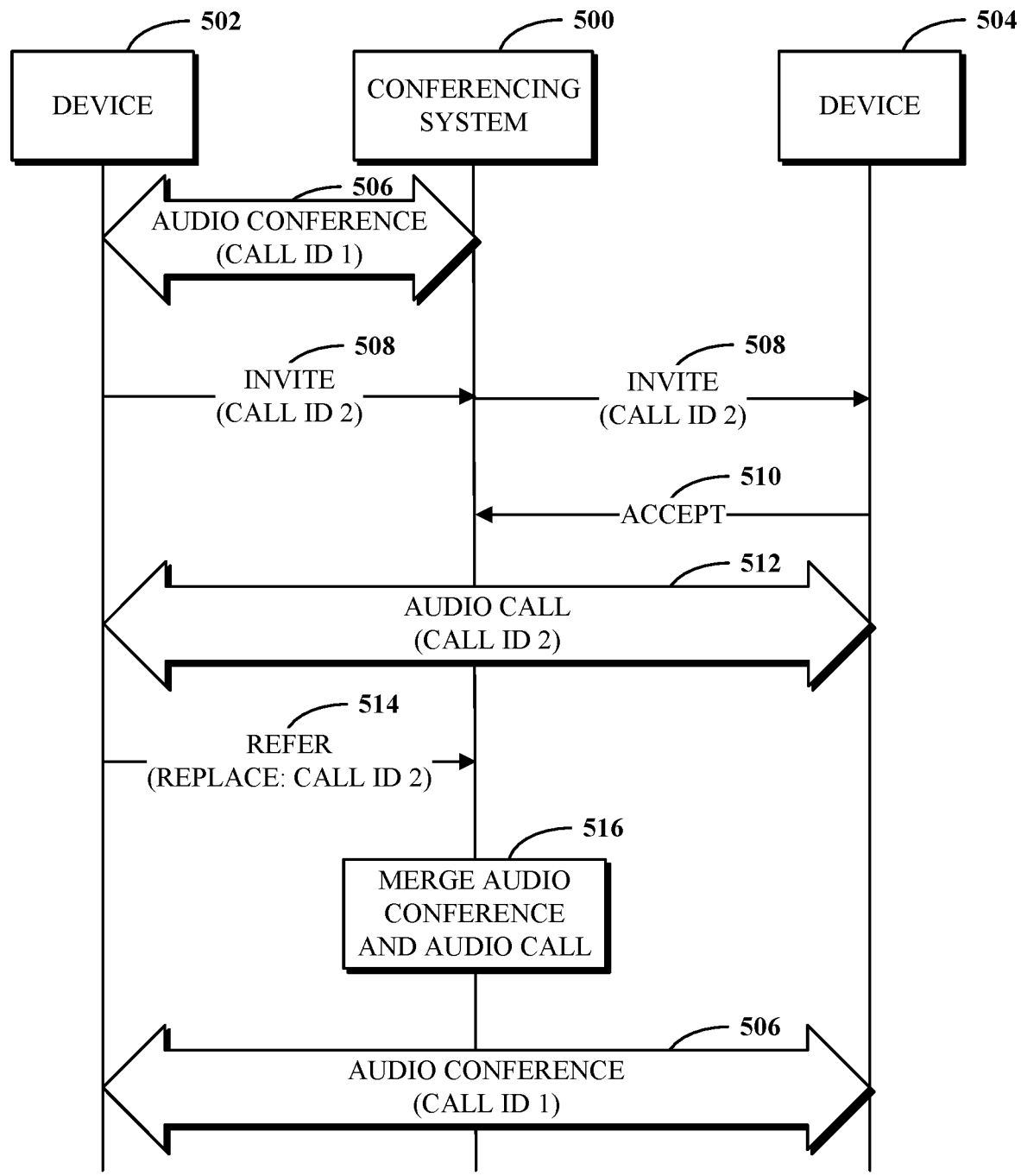
FIG. 5A is a swim lane diagram of an example of a conferencing system for adding a participant device to an ongoing cloud-based audio conference session without interruption.

FIG. 5A is a swim lane diagram of an example of a conferencing system 500 for adding a participant device to an ongoing cloud-based audio conference session without interruption. The conferencing system 500 includes a first participant device, such as device 502, and a second participant device, such as device 504. The device 502 may be the device 402 shown in FIG. 4. The device 504 may be the device 404 shown in FIG. 4. In this example, the device 502 and the device 504 may be associated with different user accounts of the conferencing system 500. For example, the device 502 may be a device associated with a user account of a first participant, and the device 504 may be a device associated with a user account of a second participant.

The conferencing system 500 is configured to facilitate an audio conference session 506 over a first channel between the device 502 and multiple other devices (not shown). The audio conference session 506 is associated with a first call ID that includes an indicator (e.g., a flag). At some point during the audio conference session 506, the device 502 receives an input (not shown), such as the input 408 shown in FIG. 4, from a user of the device 502. In response to receiving the input, the device 502 transmits an invite message 508 to the conferencing system 500. The invite message 508 may be a SIP message and may include a second call ID that shares the same indicator (e.g., the flag) as the first call ID of the audio conference session 506. The conferencing system 500 receives the invite message 508 and forwards the invite message 508 to the device 504.

The device 504 receives the invite message 508 and transmits an accept message 510 to the conferencing system 500. The accept message 510 may be a SIP message and may include the second call ID. The accept message 510 may be transmitted in response to an input, such as the input 416 shown in FIG. 4. The conferencing system 500 receives the accept message 510 and establishes an audio call 512 over a second channel between the device 502 and the device 504. The audio call 512 is associated with the second call ID.

The device 502 transmits a refer message 514 to the conferencing system 500, for example, based on a user input. The user input may be obtained via in input device, such as a keyboard, a mouse, a microphone, or a touch interface. The refer message 514 may be transmitted over the first channel. The refer message 514 may be a SIP message that has a header that includes a replace field and a refer-to field. The replace field may indicate information to replace, such as the second call ID, the flag, an indicator to transfer host privileges, server information, or other information that can be replaced. The refer-to field represents the call information between the device 502 and the device 504. The conferencing system 500 receives the refer message 514 and determines that the flag associated with the second call ID of the audio call 512 is the same as the flag that is associated with the first call ID of the audio conference session 506. Based on the determination that the flag associated with the second call ID of the audio call 512 is the same as the flag that is associated with the first call ID of the audio conference session 506, the conferencing system 500 merges 516 the audio conference session 506 and the audio call 512 by replacing the second call ID of the audio call 516 with the first call ID of the audio conference session 506. By merging the audio conference session 506 and the audio call 512, the device 504 is added to the audio conference session 506.

Figure 5B:
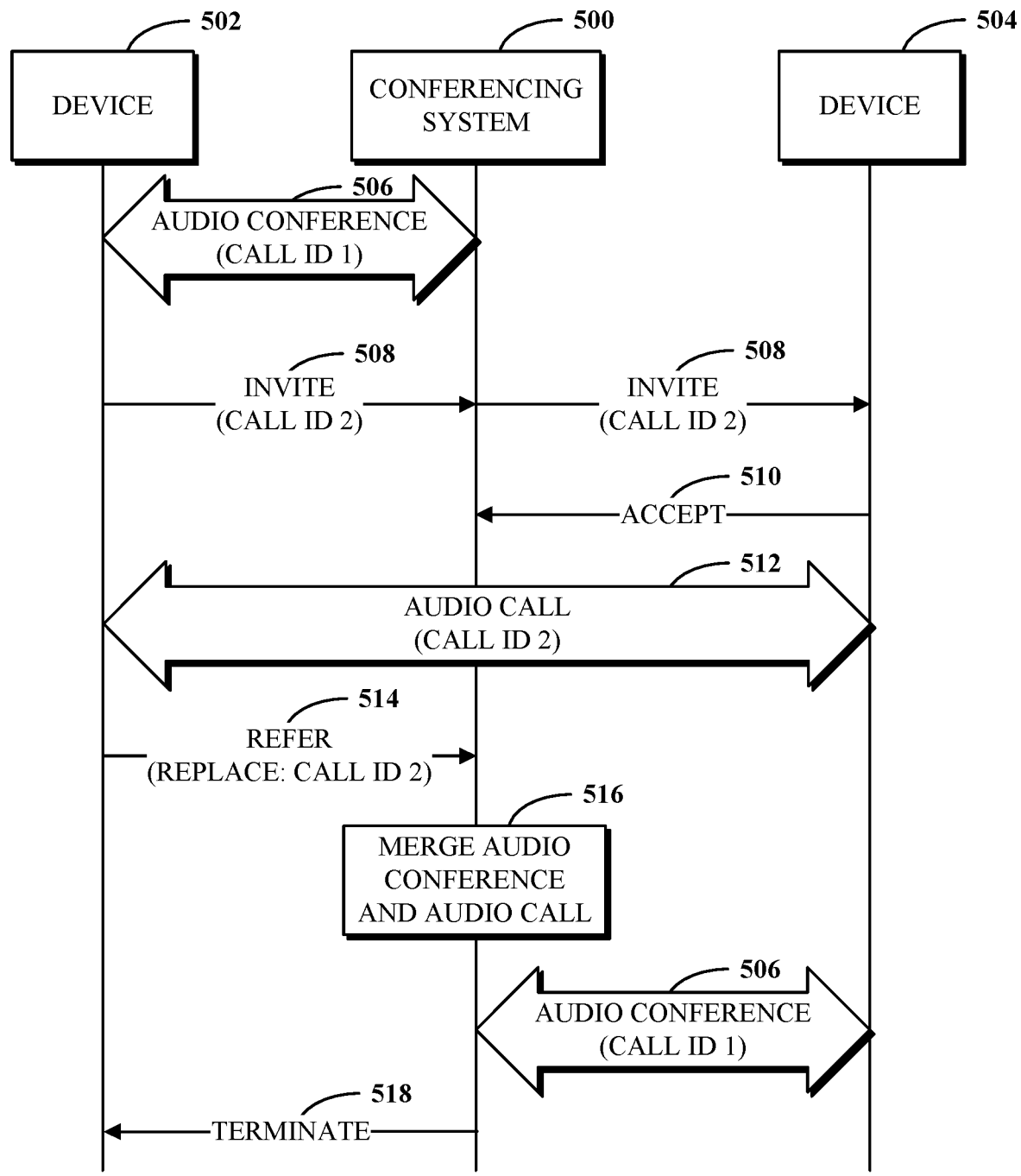
FIG. 5B is a swim lane diagram of an example of the conferencing system shown in FIG. 6A that is configured for transferring a cloud-based audio conference session including host privileges from a first participant device to a second participant device.

FIG. 5B is a swim lane diagram of an example of the conferencing system 500 shown in FIG. 5A that is configured for transferring the audio conference session 506 including host privileges from the device 502 to the device 504. In this example, the conferencing system 500 receives the refer message 514 and determines that the flag associated with the second call ID of the audio call 512 is the same as the flag that is associated with the first call ID of the audio conference session 506. Based on the determination that the flag associated with the second call ID of the audio call 512 is the same as the flag that is associated with the first call ID of the audio conference session 506 and an indicator to transfer host privileges, the conferencing system 500 merges 516 the audio conference session 506 and the audio call 512 by replacing the second call ID of the audio call 516 with the first call ID of the audio conference session 506 and transmits a terminate message 518 to the device 502 to disconnect the device 502 from the audio conference session 506. In an example, the audio conference session 506 between the device 502 and the conferencing system 500 may be terminated at the conferencing system 500 such that the terminate message 518 is not transmitted to the device 502. By merging the audio conference session 506 and the audio call 512, the device 504 is added to the audio conference session 506 and the host privileges for the audio conference session are transferred from the device 502 to the device 504.

Figure 6:
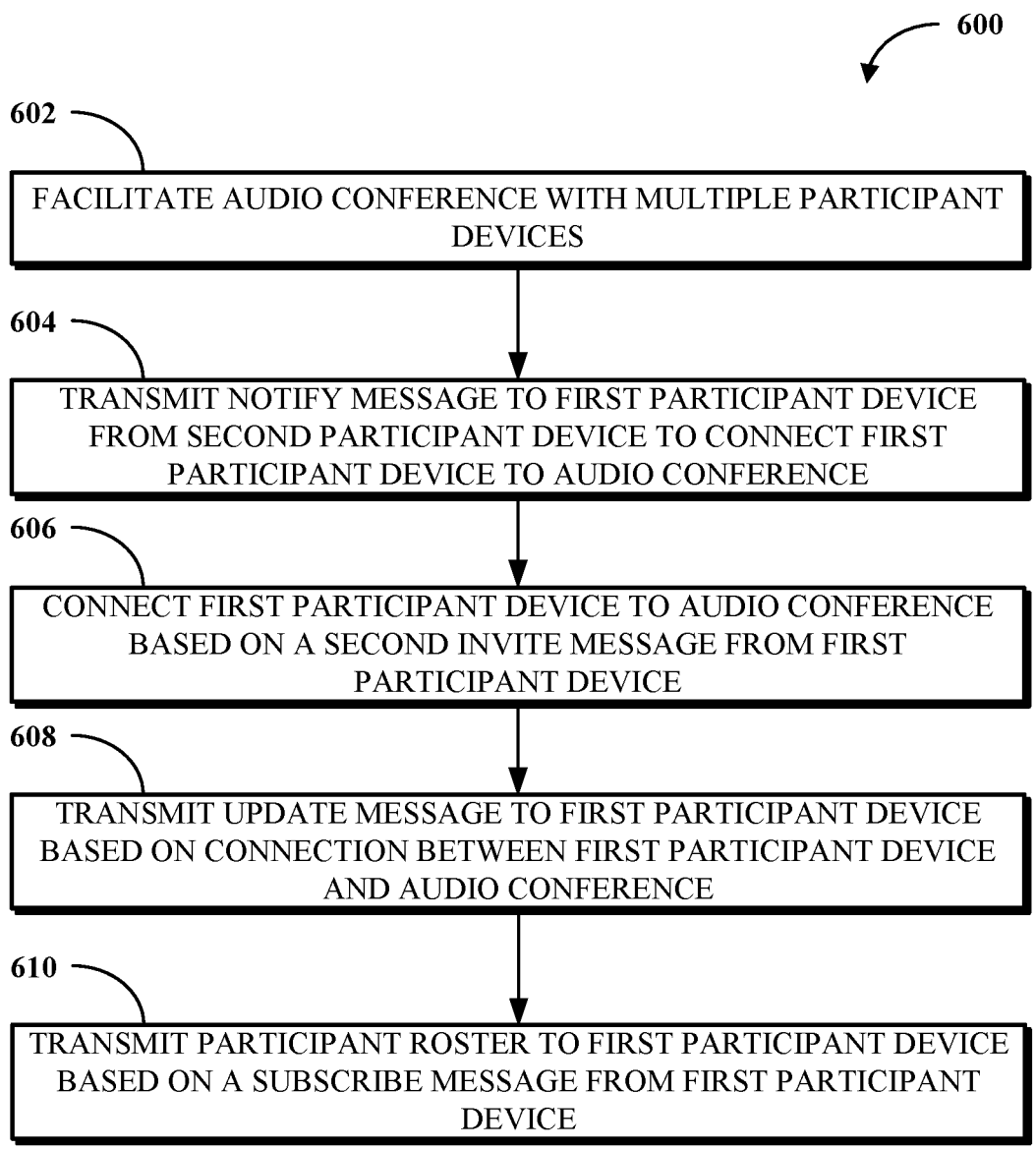
FIG. 6 is a flow chart of an example of a method for transferring a cloud-based audio conference session from a first participant device to a second participant device.
Figure 7:
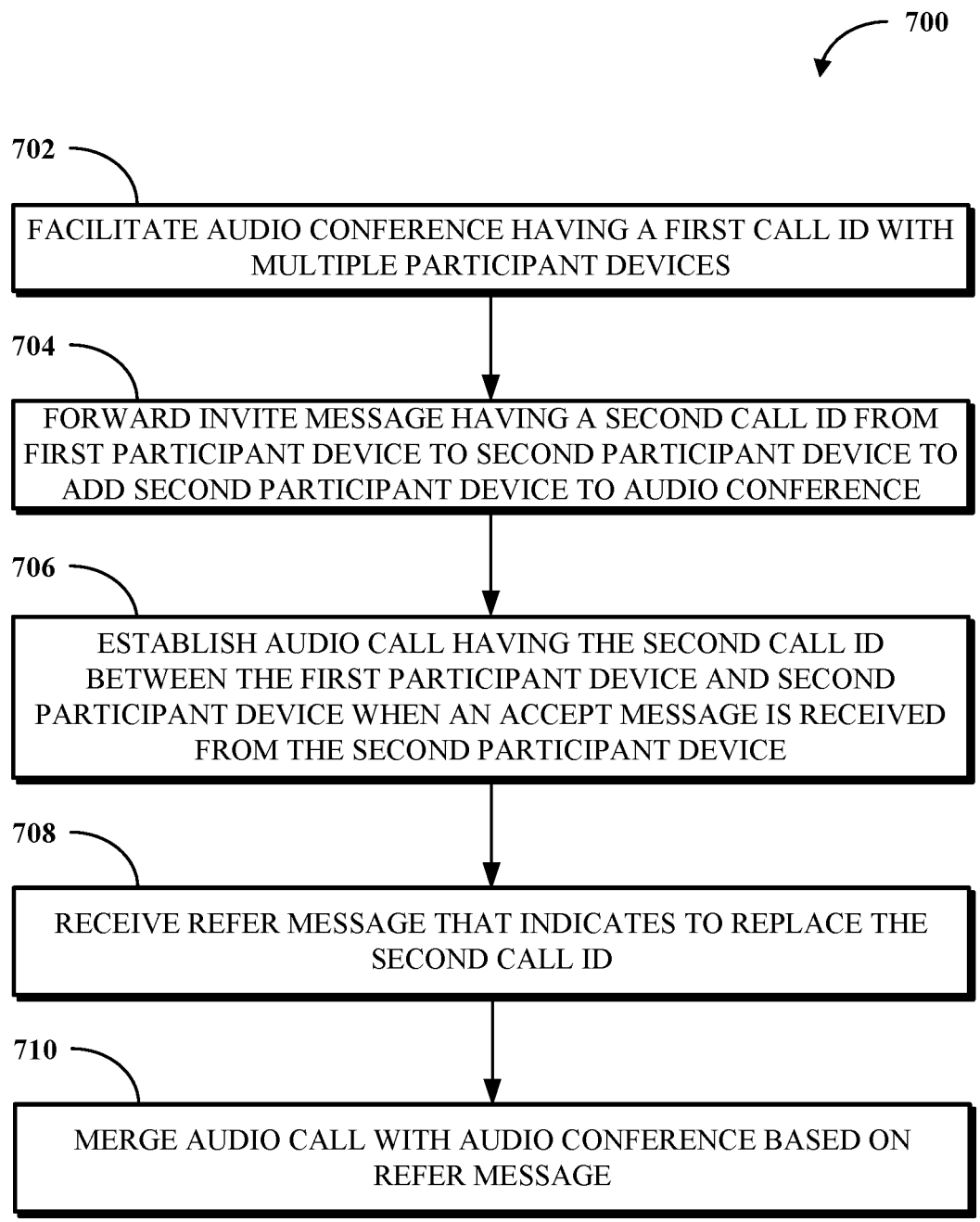
FIG. 7 is a flow chart of an example of a method for adding a participant device to an ongoing cloud-based audio conference session without interruption.

To further describe some implementations in greater detail, reference is next made to examples of techniques which may be performed by or using a system for cloud-based audio conference session transfer. FIGS. 6 and 7 are flowcharts of examples of methods for cloud-based audio conference session transfer. The methods can be executed using computing devices, such as the systems, hardware, and software described with respect to FIGS. 1-5B. The methods can be performed, for example, by executing a machine-readable program or other computer-executable instructions, such as routines, instructions, programs, or other code. The steps, or operations, of the methods, or other techniques, methods, processes, or algorithms described in connection with the implementations disclosed herein can be implemented directly in hardware, firmware, software executed by hardware, circuitry, or a combination thereof.

For simplicity of explanation, the methods are depicted and described herein as a series of steps or operations. However, the steps or operations of the methods in accordance with this disclosure can occur in various orders and/or concurrently. Additionally, other steps or operations not presented and described herein may be used. Furthermore, not all illustrated steps or operations may be required to implement a technique in accordance with the disclosed subject matter.

FIG. 6 is a flow chart of an example of a method 600 for transferring a cloud-based audio conference session from a first participant device to a second participant device. At 602, the method 600 includes facilitating an audio conference session with multiple participant devices. In this example, the first participant device may be a device that is not connected to the audio conference session and the second participant device may be one of the multiple participant devices connected to the audio conference session. In this example, the first participant device and the second participant device may be associated with a shared user account (i.e., they are both associated with the same user account).

At 604, the method 600 includes transmitting a notify message to the first participant device from the second participant device to connect the first participant device to the audio conference session. Transmitting the notify message may include placing the connection between the audio conference session and the second participant device on hold when the notify message is transmitted. The notify message may be transmitted to the first participant device based on a first invite message that is received from the second participant device. In an example, placing the connection between the audio conference session and the second participant device on hold may be based on receiving the first invite message. In addition, in some examples, the notify message may be transmitted to the first participant device based on the first participant device and the second participant device sharing a user account. The first invite message may include a request to transfer the audio conference session to the second participant device.

At 606, the method 600 includes connecting the first participant device to the audio conference session. In an example, connecting the first participant device to the audio conference session can include transferring host privileges of the audio conference session to the first participant device. The first participant device may be connected to the audio conference session based on a second invite message that is received from the first participant device. The second invite message may include an indicator that indicates that the first participant device has accepted the transfer of the audio conference session.

At 608, the method 600 includes transmitting an update message to the first participant device. The transmission of the update message may be based on the connection between the first participant device and the audio conference session. The update message may include a header that indicates an identifier associated with the audio conference session. The header may be a PAI header.

At 610, the method 600 includes transmitting a participant roster of the audio conference session to the first participant device. The transmission of the participant roster may be based on a subscribe message received from the first participant device. The subscribe message may include a header that indicates an identifier of the first participant device and/or an identifier associated with the audio conference session. The subscribe message may include a request for the participant roster of the audio conference session. The subscribe message may include a proxy authorization for the first participant device to receive the participant roster of the audio conference session.

FIG. 7 is a flow chart of an example of a method 700 for adding a participant device to an ongoing cloud-based audio conference session without interruption. At 702, the method 700 includes facilitating an audio conference session with multiple participant devices. The audio conference is facilitated over a first channel and is associated with a first call ID. The first call ID includes an indicator (e.g., a flag). In this example, a first participant device is connected to the audio conference session and a second participant device is not connected to the audio conference session.

At 704, the method 700 includes forwarding an invite message from the first participant device to the second participant device to add the second participant device to the audio conference session. The invite message includes a second call ID. The second call ID includes an indicator. The indicator of the second call ID may be the same as the indicator of the first call ID.

At 706, the method 700 includes establishing an audio call between the first participant device and the second participant device when an accept message is received from the second participant device. Establishing the audio call between the first participant device and the second participant device includes opening a channel between the first participant device and the second participant device. The channel between the first participant device and the second participant device is associated with the second call ID.

At 708, the method 700 includes receiving a refer message that indicates to replace the second call ID. The refer message may be received in response to the establishment of the audio call between the first participant device and the second participant device. At 710, the method 700 includes merging the audio call with the audio conference session based on the refer message. Merging the audio call with the audio conference session may be based on a determination that the indicator associated with the second call ID of the audio call is the same as the indicator that is associated with the first call ID of the audio conference session. The audio call and the audio conference session are merged by replacing the second call ID of the audio call with the first call ID of the audio conference session. By merging the audio conference session and the audio call, the second participant device is added to the audio conference session.

In an example where the audio conference session is transferred to the second participant device, the audio call and the audio conference session may be merged such that the audio conference session is continued with the second participant device and a terminate message is transmitted to the first participant device to disconnect the first participant device from the audio conference. In this example, any host privileges of the first participant device are transferred to the second participant device based on an indicator in the refer message that indicates a transfer of the host privileges to the second participant device.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
    facilitating an audio conference with multiple participant devices;
    transmitting a notify message to a first participant device to connect to the audio conference based on a first invite message from a second participant device of the multiple participant devices;
    connecting the first participant device to the audio conference based on a second invite message from the first participant device indicating acceptance of the audio conference;
    transmitting an update message to the first participant device based on the connection between the first participant device and the audio conference; and
    transmitting a participant roster of the audio conference to the first participant device based on a subscribe message from the first participant device indicating a request for the participant roster of the audio conference.

2. The method of claim 1, wherein the first participant device and the second participant device are associated with a shared account.

3. The method of claim 1, wherein the first participant device and the second participant device are associated with a shared account, further comprising:
    transmitting the notify message based on the shared account.

4. The method of claim 1, further comprising:
    placing the connection between the audio conference and the second participant device on hold when the notify message is transmitted.

5. The method of claim 1, wherein the update message includes a header that indicates an identifier associated with the audio conference.

6. The method of claim 1, wherein the update message includes a P-Asserted-Identity (PAI) header that indicates an identifier associated with the audio conference.

7. The method of claim 1, wherein the subscribe message includes a header that indicates an identifier of the first participant device.

8. A system, comprising:
    a server comprising at least one processor and at least one memory, the server configured to:
        facilitate an audio conference with multiple participant devices;
        transmit a notify message to a first participant device to connect to the audio conference based on a first invite message from a second participant device of the multiple participant devices;

connect the first participant device to the audio conference based on a second invite message from the first participant device that indicates acceptance of the audio conference;
transmit an update message to the first participant device based on the connection between the first participant device and the audio conference; and
transmit a participant roster of the audio conference to the first participant device based on a subscribe message from the first participant device that indicates a request for the participant roster of the audio conference.

9. The system of claim 8, wherein the first participant device and the second participant device are associated with a same user account.

10. The system of claim 8, wherein the update message is a session initiation protocol (SIP) message.

11. The system of claim 8, wherein the server is further configured to:
placing the connection between the audio conference and the second participant device on hold based on the first invite message.

12. The system of claim 8, wherein the subscribe message includes a proxy authorization for the first participant device.

13. The system of claim 8, wherein the subscribe message includes a header that indicates an identifier associated with the audio conference.

14. The system of claim 8, wherein the server is further configured to:
transfer host privileges of the audio conference to the first participant device.

15. A non-transitory computer-readable medium comprising instructions, that when executed by one or more processors, cause the one or more processor to perform operations comprising:
facilitating an audio conference with multiple participant devices;
transmitting a notify message to a first participant device to connect to the audio conference based on a first invite message from a second participant device of the multiple participant devices;
connecting the first participant device to the audio conference based on a second invite message from the first participant device indicating acceptance of the audio conference;
transmitting an update message to the first participant device based on the connection between the first participant device and the audio conference; and
transmitting a participant roster of the audio conference to the first participant device based on a subscribe message from the first participant device indicating a request for the participant roster of the audio conference.

16. The non-transitory computer-readable medium of claim 15, wherein the first invite message is a session initiation protocol (SIP) message.

17. The non-transitory computer-readable medium of claim 15, wherein the notify message is transmitted to all devices that are associated with a user account associated with a user of the second participant device.

18. The non-transitory computer-readable medium of claim 15, further comprising:
receiving the second invite message based on an input at the first participant device.

19. The non-transitory computer-readable medium of claim 15, wherein the subscribe message includes a proxy authorization.

20. The non-transitory computer-readable medium of claim 15, wherein the update message includes a P-Asserted-Identity (PAI) header that is associated with the audio conference.

* * * * *